Sept. 17, 1946. A. BUTCHER 2,407,947
APPARATUS FOR THE CLARIFICATION OF LIQUIDS
Filed June 19, 1945
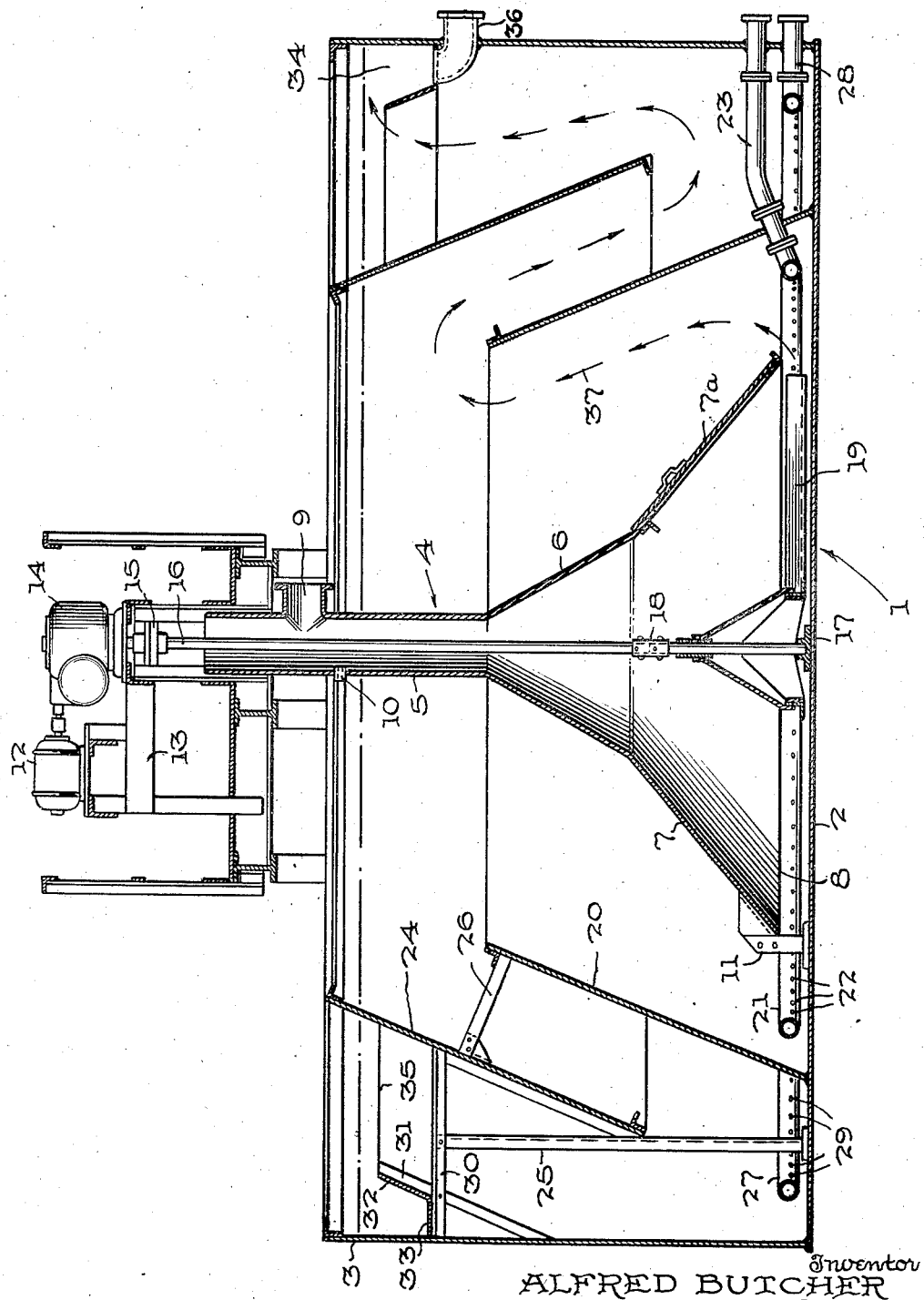
Inventor
ALFRED BUTCHER Patented Sept. 17, 1946

2,407,947

UNITED STATES PATENT OFFICE 2,407,947

APPARATUS FOR THE CLARIFICATION OF LIQUIDS

Alfred Butcher, Pittsburgh, Pa., assignor to Gulf Oil Corporation, Pittsburgh, Pa., a corporation of Pennsylvania Application June 19, 1945, Serial No. 600,274

8 Claims. (Cl. 210—16)

This invention relates to apparatus for the clarification of liquids, particularly where a coagulant is used as in the clarification of water, and has a main object to provide a relatively simple and easily constructed system whereby floc formation and removal are effectively accomplished and a well-clarified effluent is secured. In the accompanying drawing I have shown the new apparatus in practical embodiment, by way of example, the drawing being a vertical axial section.

Referring thereto, reference number 1 designates generally a metal tank having a circular bottom wall 2 and a cylindrical side wall 3. Reference numeral 4 designates a downcomer in the form of a vertical tubular column disposed centrally of the tank and having a cylindrical upper portion 5 and a flared lower portion comprising conical frusta 6 and 7 of which the former is substantially steeper than the latter. Portion 7 terminates downwardly in a lower horizontal edge 8 spaced above the tank bottom and the area defined by this edge is many times greater than the cross-sectional area of the top portion 5. Near its upper end, the latter is provided with an inlet 9 for the liquid to be treated, here assumed to be water, an inlet 10 for the coagulant being provided below the inlet 9. The upper end of the downcomer is open. The downcomer is supported by means of short pedestals as at 11 fixed to the tank bottom and to the lower portion 7. The latter includes an inspection door 7a.

As here shown, an electric motor 12 is mounted on any suitable framework 13 above the tank and drives into a speed reducer 14 which has a vertical output shaft connected through a coupling 15 with a vertical shaft 16 disposed centrally of the downcomer with its lower end stepped in a pillow block 17 fixed on the tank bottom. Shaft 16 is made in two parts joined by a frangible coupling 18 and the lower section of the shaft carries a hub portion equipped with blades as at 19 preferably arranged tangentially to a circle concentric with the shaft with the blades in trailing relation when the shaft is normally driven. The blades 19 sweep over that portion of the tank bottom beneath the downcomer with an outward propelling effect through the annular opening existing between the edge 8 and the tank bottom.

Arranged concentrically with the downcomer with its lower edge welded to the tank bottom is an annular baffle 20 having the form of a frustum of a cone, the baffle together with the included portion of the bottom 2 defining in effect a tank within the main tank 1. As here shown, the upper edge of the baffle 20 is on the level of the upper end of the portion 6 of the downcomer.

Reference numeral 21 designates a circular pipe disposed around the downcomer and concentrically therewith in the corner which exists between baffle 20 and the tank bottom. The pipe is provided with a multiplicity of openings 22 and a draw-off pipe 23 in connection with pipe 21 is led through the baffle 20 and side wall 3 to suitable suction means, the pipe 23 being sealed in openings in the baffle and side wall.

Concentrically disposed with respect to baffle 20 is a similar conical frustum 24 which extends from the top of the tank down to a level here shown as about midway of the height of baffle 20. Baffle 24 is supported by means of suitable frames as at 25 and by struts as at 26 extending between the two baffles. A circular pipe 27 concentric with the tank bottom is disposed in the corner between the side and bottom walls of the main tank and is in connection with a draw-off pipe 28 which is led through the side wall 3 and sealed therein. Pipe 27 is provided with perforations 29.

Supported by horizontal top members as at 30 of frames 25 and by brackets as at 31 secured to the side wall 3, is an annular formation comprising a side wall 32 and a bottom wall 33, the latter being welded throughout to the inside of peripheral wall 3 so that a water withdrawal trough 34 is defined, the upper overflow edge 35 of the trough being at a level below the top of baffle 24 but above the top of baffle 20.

In the use of the apparatus the spreader or agitator constituted by the blades 19 is set in motion, turbid water is admitted at 9, and a coagulant of suitable character is injected at 10. As the water and added coagulant move downwardly, their velocity is decreased due to the increasing areas provided by the flared lower portion of the downcomer. The stirring mechanism prevents the sludge from accumulating under the downcomer, pushing it out into the space defined by the baffle 20. The stirrer also acts as a floc former since it accelerates the mutual adsorption of the sludge particles.

Baffle 20 enforces upward movement of the entire outflow from the downcomer. Within baffle 20 the floc tends to roll slowly toward the baffle, then upwardly, then over toward the axis, and then down, cascading on the flared portion of the downcomer and joining the newly made floc which is emerging from beneath the downcomer. At the same time the action of the stirrer tends to turn the entire body of water and floc within the inner tank so that the floc particles have also a spiral motion, giving an extended distance of travel.

The flow over the top of baffle 20 should normally be substantially clear, but in order to block direct access to the collecting trough 34, baffle 24 enforces a downward flow so that a secondary precipitation can effectively occur. The clear water rises outside of baffle 24 to flow over the edge 35 into the trough 34 whence it is withdrawn through a fitting 36 which extends through the wall 3. The path of flow is indicated by the succession of arrows 37.

As the floc forms and gathers in the corners of the inner and outer tanks, it is removed by the rings 21 and 27.

It will be evident that after the water leaves the lower end of the upper section 5 of the downcomer the speed of flow becomes progressively slower due to the progressively increasing areas and floc formation and deposition are promoted by the baffles, particularly the inner one. The precipitate is localized at the rings so as to be readily withdrawn with minimum water loss. Without the baffle arrangement, the floc particles would be finely scattered over the tank bottom and the withdrawal of sludge would be very inefficient, resulting in a high percentage of lost water.

What I claim is:

1. A liquid clarifier comprising a tank having a bottom and a peripheral wall, a downcomer for the liquid to be treated, disposed substantially centrally of the tank and terminating in a lower edge spaced above the tank bottom, a rotatable vertical shaft mounted centrally of said downcomer, means for rotating said shaft, agitator blades carried by said shaft and adapted to sweep over the tank bottom with a horizontal propelling effect, an annular baffle surrounding the lower portion of the downcomer and adapted to direct upwardly the outflow from beneath said lower edge, an annular liquid withdrawal trough in said tank surrounding said baffle, a perforated annular sludge withdrawal conduit within said baffle adjacent the lower portion thereof toward which said agitator blades sweep precipitated sludge, a second annular baffle disposed between said trough and first baffle, said second baffle extending above and below the upper edge of the first baffle and above the upper edge of said trough and terminating downwardly a distance above the tank bottom, and a perforated annular sludge withdrawal conduit in the tank adjacent the lower portion of said peripheral wall.

2. A liquid clarifier comprising a tank having a bottom and a peripheral wall, a downcomer for the liquid to be treated, disposed substantially centrally of the tank and terminating in a lower edge spaced above the tank bottom, a rotatable vertical shaft mounted centrally of said downcomer, means for rotating said shaft, agitator blades carried by said shaft and adapted to sweep over the tank bottom with a horizontal propelling effect, an annular baffle in the form of a truncated cone surrounding the lower portion of said downcomer and adapted to direct upwardly the outflow from said lower end, an annular liquid withdrawal trough in said tank surrounding said baffle, a perforated annular sludge withdrawal conduit within said baffle adjacent the lower portion thereof toward which said agitator blades sweep precipitated sludge, a second annular baffle in the form of a truncated cone between said trough and first baffle, said second baffle extending above and below the upper edge of the first baffle and above the upper edge of said trough and terminating downwardly a distance above the tank bottom, and a perforated annular sludge withdrawal conduit in the tank adjacent the lower portion of said peripheral wall.

3. A liquid clarifier comprising a tank having a bottom and a peripheral wall, a downcomer for the liquid to be treated, disposed substantially centrally of the tank and terminating in a lower edge spaced above the tank bottom, a rotatable vertical shaft mounted centrally of said downcomer, means for rotating said shaft, agitator blades carried by said shaft and adapted to sweep over the tank bottom with a horizontal propelling effect, an annular baffle surrounding the lower portion of the downcomer and adapted to direct upwardly the outflow from beneath said lower edge, an annular liquid withdrawal trough in said tank surrounding said baffle, a perforated annular sludge withdrawal conduit within said baffle adjacent the lower portion thereof toward which said agitator blades sweep precipitated sludge, a second annular baffle disposed between said trough and first baffle, said second baffle extending above and below the upper edge of the first baffle and terminating downwardly a distance above the tank bottom, and a perforated annular sludge withdrawal conduit in the tank adjacent the lower portion of said peripheral wall, the upper edge of said trough being above the upper edge of the first baffle and the upper edge of the second baffle being above the upper edge of said trough so that flow over the top of the first baffle must all pass beneath the second baffle in order to reach the trough.

4. A liquid clarifier comprising a tank having a bottom and a peripheral wall, a downcomer for the liquid to be treated, disposed substantially centrally of the tank and terminating in a lower edge spaced above the tank bottom, a rotatable vertical shaft mounted centrally of said downcomer, means for rotating said shaft, agitator blades carried by said shaft and adapted to sweep over the tank bottom with a horizontal propelling effect, an annular baffle in the form of a truncated cone surrounding the lower portion of said downcomer and adapted to direct upwardly the outflow from said lower end, an annular liquid withdrawal trough in said tank surrounding said baffle, a perforated annular sludge withdrawal conduit within said baffle adjacent the lower portion thereof toward which said agitator blades sweep precipitated sludge, a second annular baffle in the form of a truncated cone between said trough and first baffle, said second baffle extending above and below the upper edge of the first baffle and terminating downwardly a distance above the tank bottom, and a perforated annular sludge withdrawal conduit in the tank adjacent the lower portion of said peripheral wall, the upper edge of said trough being above the upper edge of the first baffle and the upper edge of the second baffle being above the upper edge of said trough so that flow over the top of the first baffle must all pass beneath the second baffle in order to reach the trough.

5. A liquid clarifier comprising a tank having a bottom and a peripheral wall, a hollow vertical column disposed substantially centrally of the tank and having a symmetrical downwardly flaring lower end terminating in an edge spaced above the tank bottom, said column constituting a downcomer for the liquid to be treated, a rotatable vertical shaft mounted centrally of said column, means for rotating said shaft, blades carried by said shaft and adapted to sweep over the tank bottom with a propelling effect outwardly of said lower end, an annular baffle surrounding the lower portion of said downcomer and adapted to direct upwardly the outflow from said lower end, an annular liquid withdrawal trough in said tank surrounding said baffle, and a perforated annular sludge withdrawal conduit within said baffle adjacent the lower portion thereof toward which said blades sweep precipitated sludge, a second annular baffle disposed between said trough and first baffle, said second baffle extending above and below the upper edge of the first baffle and above the upper edge of said withdrawal trough and terminating downwardly a distance above the tank bottom, and a perforated annular sludge withdrawal conduit in the tank adjacent the lower portion of said peripheral wall.

6. A liquid clarifier comprising a tank having a bottom and a peripheral wall, a hollow vertical column disposed substantially centrally of the tank and having a symmetrical downwardly flaring lower end terminating in an edge spaced above the tank bottom, said column constituting a downcomer for the liquid to be treated, a rotatable vertical shaft mounted centrally of said column, means for rotating said shaft, blades carried by said shaft and adapted to sweep over the tank bottom with a propelling effect outwardly of said lower end, an annular baffle in the form of a truncated cone surrounding the lower portion of said downcomer and adapted to direct upwardly the outflow from said lower end, an annular liquid withdrawal trough in said tank surrounding said baffle, a perforated annular sludge withdrawal conduit within said baffle adjacent the lower portion thereof toward which said blades sweep precipitated sludge, a second annular baffle in the form of a truncated cone between said trough and first baffle, said second baffle extending above and below the upper edge of the first baffle and above the upper edge of said withdrawal trough and terminating downwardly a distance above the tank bottom, and a perforated annular sludge withdrawal conduit in the tank adjacent the lower portion of said peripheral wall.

7. A liquid clarifier comprising a tank having a bottom and a peripheral wall, a hollow vertical column disposed substantially centrally of the tank and having a symmetrical downwardly flaring lower end terminating in an edge spaced above the tank bottom, said column constituting a downcomer for the liquid to be treated, a rotatable vertical shaft mounted centrally of said column, means for rotating said shaft, blades carried by said shaft and adapted to sweep over the tank bottom with a propelling effect outwardly of said lower end, an annular baffle surrounding the lower portion of said downcomer and adapted to direct upwardly the outflow from said lower end, an annular liquid withdrawal trough in said tank surrounding said baffle, and a perforated annular sludge withdrawal conduit within said baffle adjacent the lower portion thereof toward which said blades sweep precipitated sludge, a second annular baffle disposed between said trough and first baffle, said second baffle extending above and below the upper edge of the first baffle and terminating downwardly a distance above the tank bottom, and a perforated annular sludge withdrawal conduit in the tank adjacent the lower portion of said peripheral wall, the upper edge of said trough being above the upper edge of the first baffle and the upper edge of the second baffle being above the upper edge of said trough so that flow over the top of the first baffle must all pass beneath the second baffle in order to reach the trough.

8. A liquid clarifier comprising a tank having a bottom and a peripheral wall, a hollow vertical column disposed substantially centrally of the tank and having a symmetrical downwardly flaring lower end terminating in an edge spaced above the tank bottom, said column constituting a downcomer for the liquid to be treated, a rotatable vertical shaft mounted centrally of said column, means for rotating said shaft, blades carried by said shaft and adapted to sweep over the tank bottom with a propelling effect outwardly of said lower end, an annular baffle in the form of a truncated cone surrounding the lower portion of said downcomer and adapted to direct upwardly the outflow from said lower end, an annular liquid withdrawal trough in said tank surrounding said baffle, a perforated annular sludge withdrawal conduit within said baffle adjacent the lower portion thereof toward which said blades sweep precipitated sludge, a second annular baffle in the form of a truncated cone between said trough and first baffle, said second baffle extending above and below the upper edge of the first baffle and terminating downwardly a distance above the tank bottom, and a perforated annular sludge withdrawal conduit in the tank adjacent the lower portion of said peripheral wall, the upper edge of said trough being above the upper edge of the first baffle and the upper edge of the second baffle being above the upper edge of said trough so that flow over the top of the first baffle must all pass beneath the second baffle in order to reach the trough.

ALFRED BUTCHER.